US012418838B2

(12) United States Patent
Godin et al.

(10) Patent No.: US 12,418,838 B2
(45) Date of Patent: Sep. 16, 2025

(54) CU-DU COMMUNICATION FOR MULTICAST WITH SUPPORT FOR SWITCHING BETWEEN UNICAST AND MULTICAST

(71) Applicant: Nokia Technologies Oy, Espoo (FI)

(72) Inventors: Philippe Godin, Versailles (FR); David Navratil, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 460 days.

(21) Appl. No.: 18/006,424

(22) PCT Filed: Aug. 4, 2020

(86) PCT No.: PCT/EP2020/071892
§ 371 (c)(1),
(2) Date: Jan. 23, 2023

(87) PCT Pub. No.: WO2022/028677
PCT Pub. Date: Feb. 10, 2022

(65) Prior Publication Data
US 2023/0354106 A1    Nov. 2, 2023

(51) Int. Cl.
*H04W 36/00*      (2009.01)
*H04B 7/06*       (2006.01)
(Continued)

(52) U.S. Cl.
CPC ...... *H04W 36/0007* (2018.08); *H04B 7/0626* (2013.01); *H04W 36/0085* (2018.08);
(Continued)

(58) Field of Classification Search
CPC .................................................. H04W 4/80
See application file for complete search history.

(56) References Cited

U.S. PATENT DOCUMENTS

2006/0200576 A1   9/2006  Pickens et al.
2009/0023453 A1*  1/2009  Hu ................. H04L 12/189
                                                  455/452.1
(Continued)

FOREIGN PATENT DOCUMENTS

WO   2019/129212 A1   7/2019
WO   2020/035795 A1   2/2020
WO   2021/236055 A1  11/2021

OTHER PUBLICATIONS

"3rd Generation Partnership Project; Technical Specification Group Radio Access Network; NG-RAN; Architecture description (Release 16)", 3GPP TS 38.401, V16.1.0, Mar. 2020, pp. 1-50.
(Continued)

*Primary Examiner* — San Htun
(74) *Attorney, Agent, or Firm* — Nokia Technologies Oy

(57)    ABSTRACT

According to an aspect, there is provided a distributed unit for a distributed access node. The distributed unit maintains, in a memory, information on a configuration of a first radio link control leg for a unicast data radio bearer or a single cell multicast radio bearer for point-to-point transmissions and a configuration of a second radio link control leg for the single cell multicast radio bearer for point-to-multipoint transmissions. The distributed unit receives channel state information and/or hybrid automatic repeat request feedback associated with one of the first and second radio link control legs being active from a terminal device and determines, based thereon, that improved efficiency is enabled if the second radio link control leg is set as active. The distributed unit transmits, to the terminal device, an activation command for activating downlink monitoring and decoding using the group radio network temporary identifier.

8 Claims, 8 Drawing Sheets

(51) Int. Cl.
*H04W 72/30* (2023.01)
*H04W 74/02* (2009.01)
*H04W 76/12* (2018.01)
*H04W 76/22* (2018.01)
*H04W 76/40* (2018.01)

(52) U.S. Cl.
CPC ........... *H04W 72/30* (2023.01); *H04W 74/02* (2013.01); *H04W 76/12* (2018.02); *H04W 76/22* (2018.02); *H04W 76/40* (2018.02)

(56) References Cited

U.S. PATENT DOCUMENTS

| | | | |
|---|---|---|---|
| 2016/0183226 A1 | 6/2016 | Rapaport et al. | |
| 2018/0352416 A1* | 12/2018 | Ryu | H04W 4/08 |
| 2019/0166580 A1 | 5/2019 | Prasad et al. | |
| 2020/0100213 A1 | 3/2020 | Chandramouli et al. | |
| 2021/0337412 A1* | 10/2021 | Zhu | H04W 24/10 |
| 2021/0345206 A1* | 11/2021 | Akl | H04W 48/16 |
| 2021/0345375 A1* | 11/2021 | Abotabl | H04W 72/535 |
| 2023/0040690 A1* | 2/2023 | Chen | H04L 5/0053 |

OTHER PUBLICATIONS

"3rd Generation Partnership Project; Technical Specification Group Radio Access Network; NG-RAN; F1 application protocol (F1AP) (Release 16)", 3GPP TS 38.473, V16.1.0, Mar. 2020, pp. 1-240.

"New Work Item on NR support of Multicast and Broadcast Services", 3GPP TSG RAN Meeting #86, RP-193248, Agenda Item: 9.1.2, Huawei, Dec. 9-12, 2019, 5 pages.

Garro et al., "5G Mixed Mode: NR Multicast-Broadcast Services", IEEE Transactions on Broadcasting, vol. 66, No. 2, Jun. 2020, pp. 390-403.

Invitation to Pay Additional Fees received for corresponding Patent Cooperation Treaty Application No. PCT/EP2020/071892, dated Apr. 14, 2021, 15 pages.

"Discussion on the scope of NR MBS", 3GPP TSG RAN Meeting #88e, RP-200818, Agenda Item: 9.10.8, ZTE, Jun. 29-Jul. 3, 2020, 3 pages.

International Search Report and Written Opinion received for corresponding Patent Cooperation Treaty Application No. PCT/EP2020/071892, dated Jun. 7, 2021, 22 pages.

* cited by examiner

CU-DU COMMUNICATION FOR MULTICAST WITH SUPPORT FOR SWITCHING BETWEEN UNICAST AND MULTICAST

RELATED APPLICATION

This application was originally filed as PCT Application No. PCT/EP2020/071892, filed on Aug. 4, 2020, which is incorporated herein by reference in its entirety.

TECHNICAL FIELD

Various example embodiments relate to wireless communications.

BACKGROUND

In a disaggregated RAN architecture, the RAN protocol stack is effectively split into multiple RAN protocol stacks so that the individual components can be realized independently. Conventionally, a disaggregated RAN architecture comprises a central unit (CU), one or more distributed units (DUs) connected to the central unit and multiple radio units (RUs) each of which is connected to a distributed unit. Multiple different functional split options (especially between the CU and the DUs) exist. It would be advantageous if dynamic change (i.e., switching) between unicast (also referred to as point-to-point transmission) and multicast (also referred to as point-to-multipoint transmission) delivery would be enabled when using a disaggregated RAN architecture. However, problems of information exchange between the CU and the DU and configuration of the CU and the DU may arise if the layer-2 architecture providing such switching operation is integrated into a disaggregated RAN architecture. Thus, there is a need for a solution for implementing dynamic switching between unicast and multicast in disaggregated RAN architectures.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the substantially same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
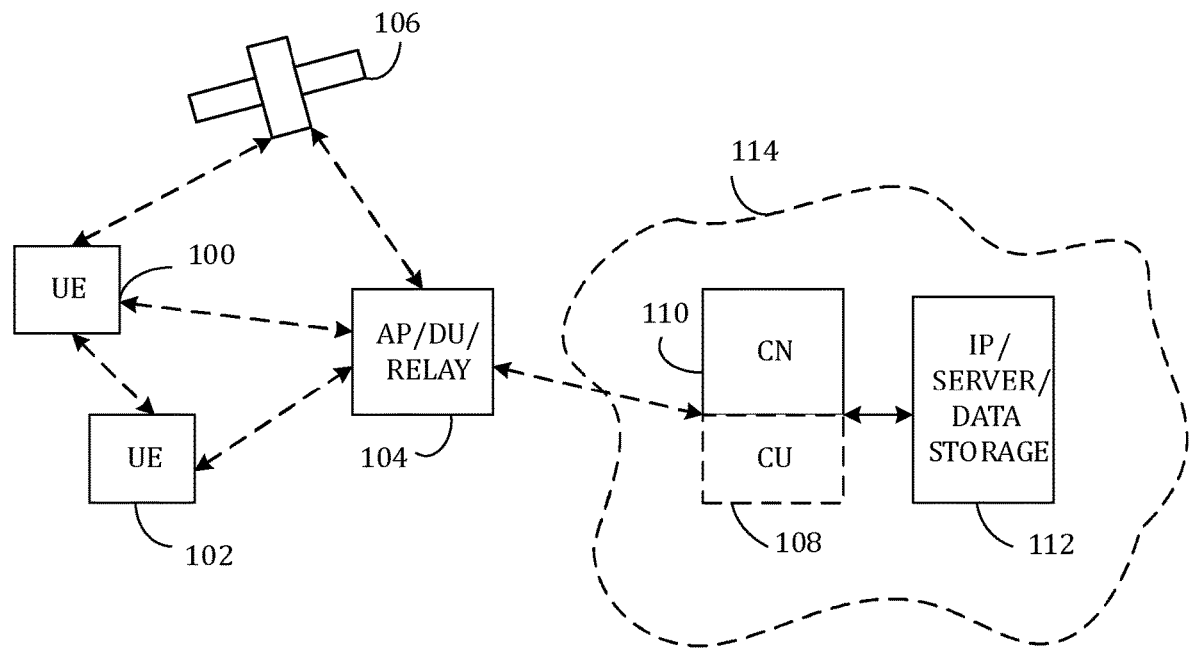
FIGS. 1 and 2 illustrate exemplified wireless communication systems.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a central or centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR)

networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
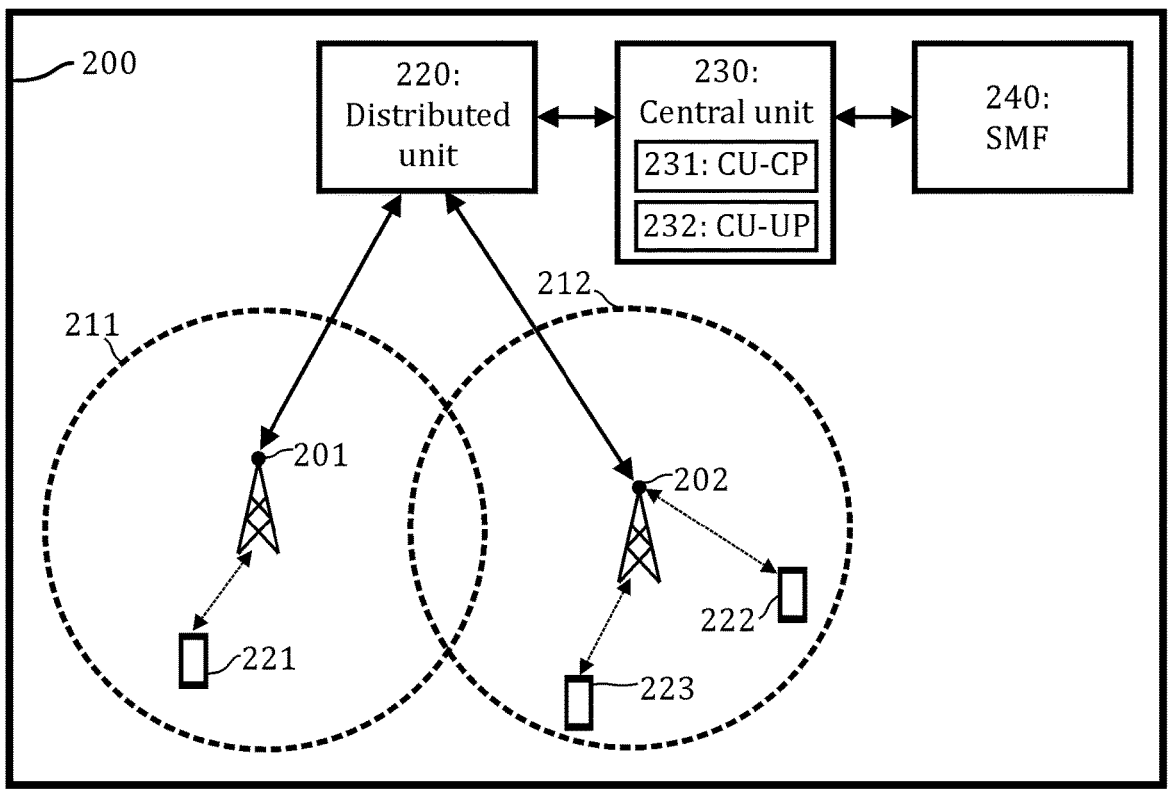

FIG. 2 illustrates another example of a communications system 200 to which some embodiments may be applied. Specifically, the illustrated communications system employs a disaggregated RAN architecture, where the RAN functionalities are distributed between different distinct units forming the RAN. The communications system 200 may correspond the communication system as discussed in relation to FIG. 1 or a part thereof. Therefore, any of the terminal devices 221, 222, 223 may correspond to either of elements 100, 102 of FIG. 1. Moreover, the access node 104 of FIG. 1 may correspond to a combination of the elements 201, 202, 220 forming a distributed access node. The illustrated communications system may be based on New Radio (NR) access technology.

Referring to FIG. 2, the communication system 200 comprises two (remote) radio units or radio heads 201, 202 providing respective (neighboring) cells 211, 212, a distributed unit 220 connected to at least one of the remote radio units 201, 202 via wired and/or wireless communications links and a central unit 230 connected to the distributed unit 220 via a wired or wireless communications link. The central unit 230 may be further connected via wired and/or wireless communications link at least to a session management function (SMF). This connection may be provided via one or more other functions or network entities not shown in FIG. 2 (e.g., via a user plane function, UPF, and/or an access management function, AMF).

At least one of the elements 201, 202, 220, 230 may be associated with the substantially same access node (e.g., the substantially same gNB). At least one remote radio unit 201, 202 may be MIMO-capable (i.e., comprise a MIMO antenna array and associated signal processing means for performing beamforming using said MIMO antenna array). Moreover, the communication system 200 comprises a plurality of terminal devices 221, 222, 223 located within said cells 211, 212. In other embodiments, the number of the remote radio units may be different compared to the illustrated example though to fully benefit from the distributed architecture, the access node should comprise at least two remote radio units. While FIG. 2 illustrates a single distributed unit 220 for simplicity, in other embodiments two or more distributed units 220 connected to the substantially same central unit 230 may be provided.

The CU 230 may comprise two separate units (or sub-units, logical nodes or entities): a control plane entity of the central unit (central unit-control plane, CU-CP) 231 and a user plane entity of the central unit (central unit-user plane, CU-UP) 232. The CU-CP 231 may, for example, host the radio resource control (RRC) and the control plane part of the packet data convergence (PDCP) protocol of the CU 230 while the CU-UP 232 may host the user plane part of the PDCP protocol and the SDAP protocol of the CU 230. The interface between the distributed unit 220 and the central unit 230 may be called an F1 interface. Specifically, the interface between the DU 220 and the CP-CU 231 may be called F1-C interface and the interface between the DU 220 and the UP-CU may be called a F1-U interface. The interface between the CU-CP and the CU-UP may be called an E1 interface.

In a disaggregated RAN architecture such as the one illustrated in FIGS. 1 and 2, the RAN protocol stack is effectively split into multiple RAN protocol stacks so that the individual components can be realized independently. Multiple different functional split options between the CU and the DUs exist. Specifically, the layer 2 (L2) functionalities may be divided. It would be beneficial if said functional split between the CU and the DUs could be realized so that dynamic change (i.e., switching) between unicast (also referred to as point-to-point transmission, PTP) and multicast (also referred to as point-to-multipoint transmission, PTM) delivery would be enabled with the disaggregated RAN architecture while maintaining service continuity for a given terminal device. However, multiple problems relating to information exchange between the CU and the DUs and configuration of the CU and the DUs may arise if the used layer 2 (L2) protocol architecture needs to be supported by the disaggregated RAN architecture. Namely, the information exchange between CU and DU and the configuration of these network elements depends on several aspects that needs to be considered when addressing said problem. For example, the switching decision (determining whether a point-to-point or point-to-multipoint transmission is to be used) as well as the data replication and forwarding may potentially be implemented in many different nodes. Also, the switching decision may be based on various different types of information attained from various sources using various means. Thus, the problem is not a trivial one and multiple solutions may be envisioned. The embodiments to be discussed below seek to overcome at least some of the problems described above.

Figure 3:
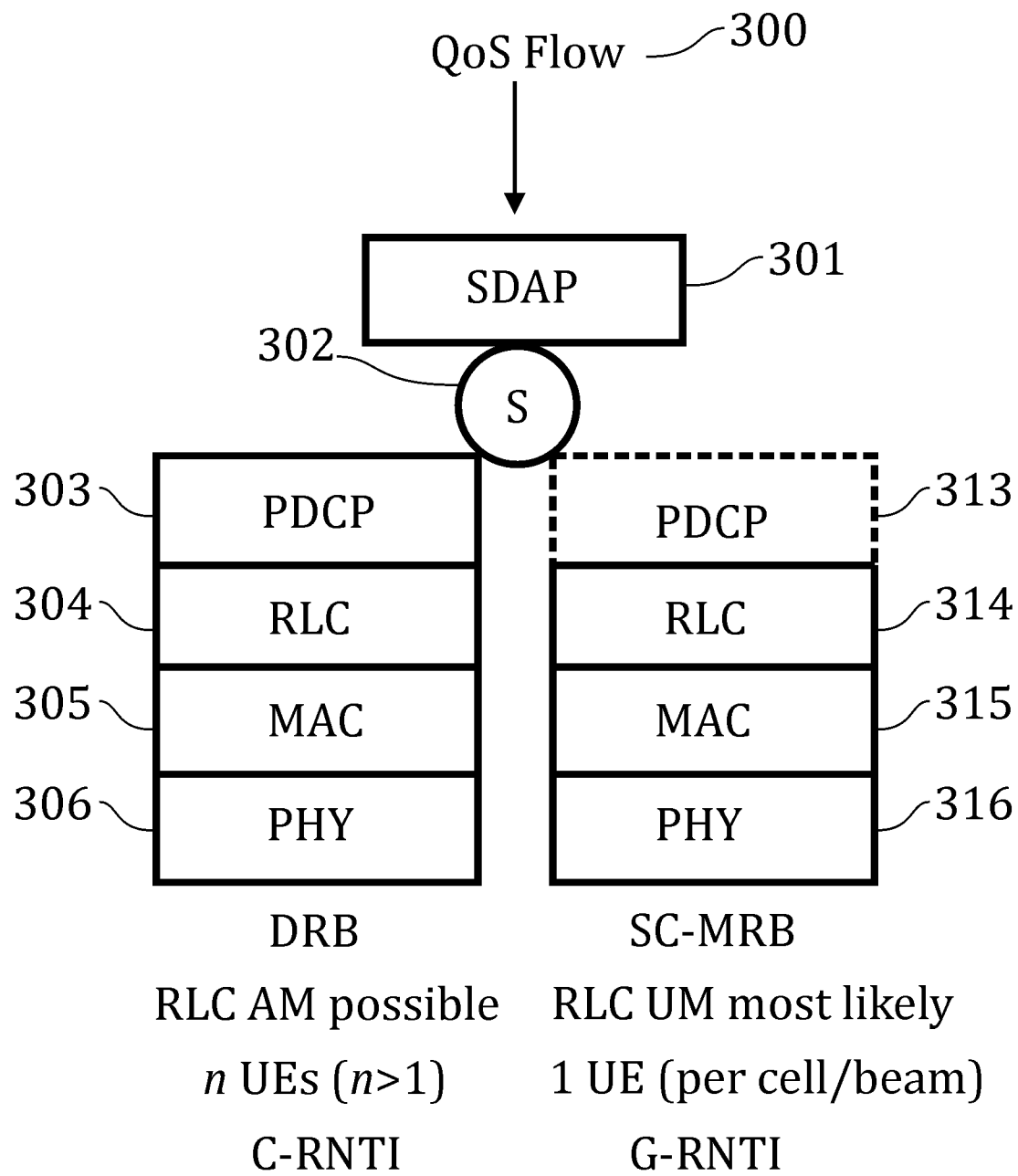
FIGS. 3 and 4 illustrate exemplified protocol architectures.
Figure 4:
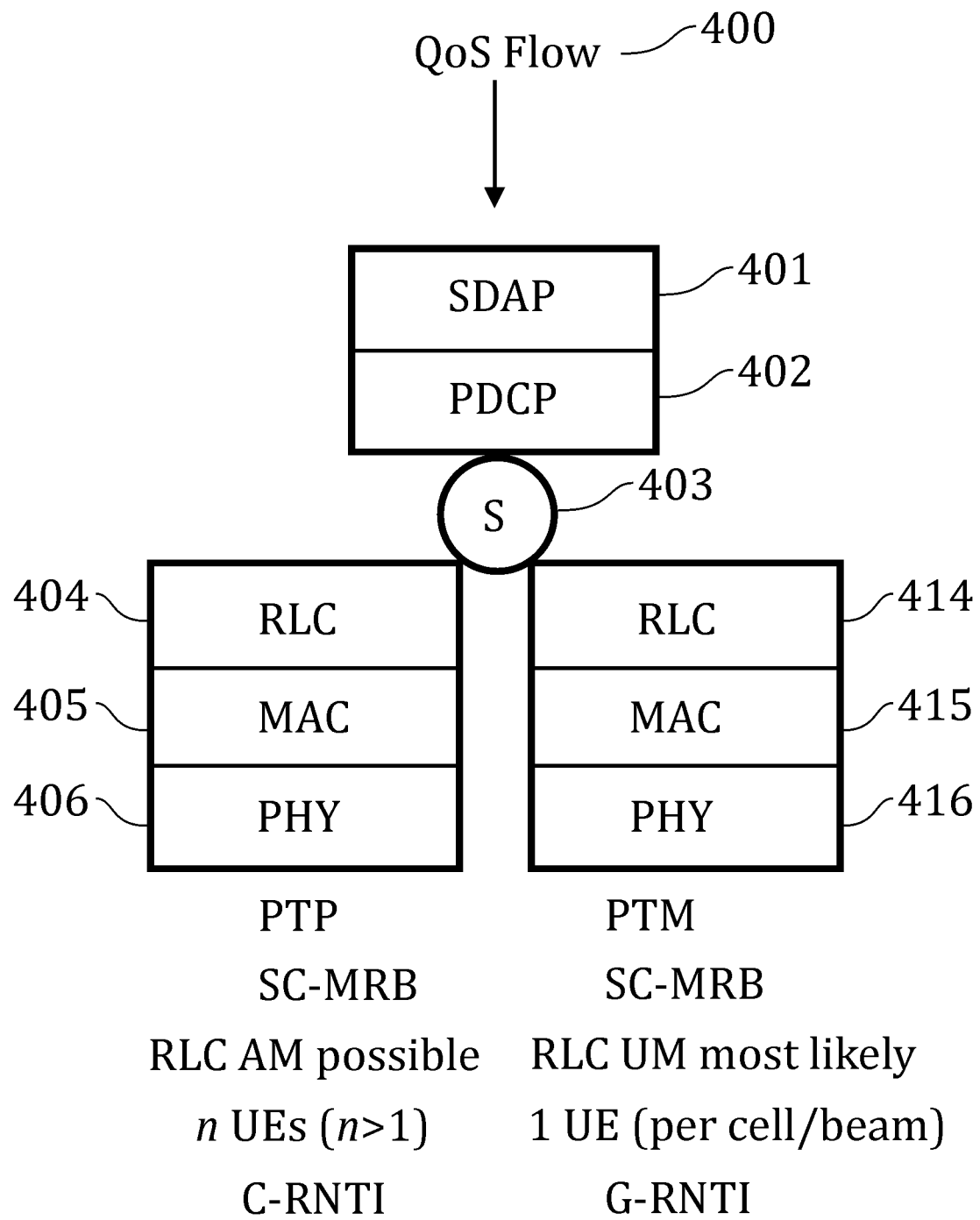

Two layer-2 (L2) protocol architecture alternatives according to embodiments are illustrated in FIGS. 3 and 4.

Referring to FIG. 3, the first L2 protocol architecture alternative uses a unicast data radio bearer (DRB) for point-to-point transmission (left side of FIG. 3 showing a first radio link control leg) and a single cell multicast radio bearer (SC-MRB) for point-to-multipoint transmission (right side of FIG. 3 showing a second radio link control leg). The network configures a unicast data radio bearer (DRB) for at least one terminal device in a multicast group and one SC-MBR for a multicast group (or session).

The illustrated protocol stack starts with a quality of service (QoS) flow 300 which is employed by a service adaptation protocol (SDAP) 301. Specifically, the SDAP 301 is responsible for QoS Flow handling across a (5G) air interface. The SDAP 301 may be used, e.g., to map a specific QoS Flow within a protocol data unit (PDU) session to a corresponding data radio bearer (DRB) (which has been established with the appropriate level of QoS). In addition, SDAP 301 may mark the transmitted packets with the correct QoS Flow ID, ensuring that the packet receives the correct forwarding treatment as it traverses the communications system. The SDAP 301 may be hosted in the CU of a distributed access node.

The element 302 denoted by "S" illustrates the location in the protocol stack where data replication and forwarding (i.e., switching) takes place. In other words, the protocol stack splits into two branches or (RLC) legs corresponding to a unicast DRB for point-to-point transmission (elements 303-306) and a SC-MRB for point-to-multipoint transmission (elements 313-316), as described above. Said legs may be equally called radio link control (RLC) legs. Here, the switching 302 between point-to-point and point-to-multipoint transmissions may occur jointly in the CU and the DU(s) of a distributed access node, as will be described in more detail below. The placement of this element 302 differs in the two alternative L2 protocol architectures of FIGS. 3 and 4.

The packet data convergence protocol (PDCP) 303, 313 may be used for radio resource control (RRC), relating to dedicated control data, and for traffic data relating to internet protocol (IP) packet and/or Ethernet frames. The PDCP 313 is illustrated in FIG. 3 with a dashed line as PDCP may not be configured from SC-MRB (like in LTE). The PDCP 303 may be hosted in the CU of a distributed access node.

The radio link control (RLC) protocol 304, 314 may provide control of the radio link between the terminal device and the (distributed) access node (i.e., eNB or gNB entity). The RLC protocol 304, 314 may operate in three different operation modes: acknowledged mode (AM), unacknowledged mode (UM) and transparent mode (TM) for which no header is added to data. In the case of the unicast DRB for PTP, it is possible to use RLC AM mode while, in the case, SC-MRB for PTM, RLC UM is most likely used. The RLC 304, 314 may be hosted in the DU(s) of a distributed access node.

The medium access control (MAC) protocol 305, 315 may provide at least some of the following functionalities: multiplexing RLC frames from multiple instances in a transport block, allocating resources via a scheduling mechanism for both transmission directions and managing retransmission in the case of error via the hybrid automatic repeat request (HARQ) mechanism. The MAC layer protocol 305, 315 derives radio network temporary identifiers (RNTIs) identifying RRC Connection and scheduling which is dedicated to a particular terminal device (or particular group of terminal devices) and provides them to the physical layer. Specifically, the MAC protocol 305 corresponding to the unicast DRB for point-to-point transmissions may define cell-RNTIs (C-RNTIs) identifying individual terminal devices while the MAC protocol 315 corresponding to the SC-MRB for point-to-multipoint transmissions may define group-RNTIs (G-RNTIs) identifying groups of terminal devices. The MAC protocol 305, 315 may be hosted in the DU(s) of a distributed access node.

The physical layer (PHY) 306, 316 interacts with actual hardware and signaling mechanisms. It defines the hardware equipment, cabling, wiring, frequencies, pulses used to represent binary signals and so on. Physical layer 306, 316 converts frames received from the data link layer to electrical pulses, which represent binary data. The binary data is then sent over the wired or wireless transmission media. The PHY 306, 316 uses radio network temporary identifiers (RNTIs) for performing data decoding for terminal devices. Specifically, in the case of the unicast DRB for PTP, C-RNTIs may be used for performing decoding for individual terminal devices while, in the case of SC-MRB for point-to-multipoint transmissions, G-RNTIs may be used for performing decoding for a group of terminal devices. The physical layer 306, 316 may be hosted in the DU(s) and/or in the RU(s) of a distributed access node.

Referring to FIG. 4, the second L2 protocol architecture alternative according to embodiments uses a SC-MRB for both point-to-point and point-to-multipoint transmissions in a split bearer manner, i.e., PDCP PDUs may be transmitted either to a point-to-point branch or leg (defined by elements 404-406) of the SC-MRB or point-to-multipoint branch (defined by elements 414-416) of the SC-MRB. At least one leg of SC-MRB has its own RLC entities 404, 414. Said legs may be thus called RLC legs, as mentioned above. In other words, the element 403 illustrating the location in the protocol stack where data replication and forwarding (i.e., switching) takes place directly follows the PDCP 402 in the stack (as opposed to directly following the SDAP 301 as in FIG. 3). Consequently, the switching 403 between point-to-point and point-to-multipoint transmissions may occur, in this case, solely in the DU(s) of a distributed access node, as will be described in more detail below. This placement provides the benefit that one shared F1-U tunnel may be used for handling the SC-MRB associated with multiple RLC legs whereas, in the case of the first L2 protocol architecture alternative of FIG. 3, a separate F1-U tunnel may be needed for each radio bearer (i.e., for each of at least one DRB and for each of at least one SC-MRB).

The definitions (e.g., general definitions for PDAP, PDCP, RLC, MAC and PHY) provided in connection with elements 300-306, 313-316 of FIG. 3 may apply, mutatis mutandis, to corresponding elements 400-406, 414-416 of FIG. 4, unless otherwise stated.

The embodiments to be discussed below in detail provide solutions for handling of unicast DRBs and SC-MRBs, which are transmitted as point-to-multipoint (PTM) broadcasts in a cell, and provide the necessary signaling over the F1 interface (i.e., FI-C and FI-U interfaces) to perform all or at least some of the following functionalities:
  setting up RLC leg per DRB and RLC leg per SC-MRB in the DU when a terminal device joins a multicast service (or a multicast session), releasing the RLC leg for DRB and RLC leg for SC-MRB in the DU when a terminal device leaves a multicast service setting up the F1-U tunnel associated to at least one created DRB or SC-MRB in case of data replication above PDCP (e.g., as in the architecture of FIG. 3), setting up the F1-U shared tunnel in case of data replication above RLC (e.g., as in the architecture of FIG. 4), indicating a switch from PTP to PTM or from PTM to PTP from DU to CU in case of replication above PDCP (e.g., as in the architecture of FIG. 3) and carrying the RRC reconfiguration of DRB into SC-MRB or of SC-MRB into DRB.

Figure 5:
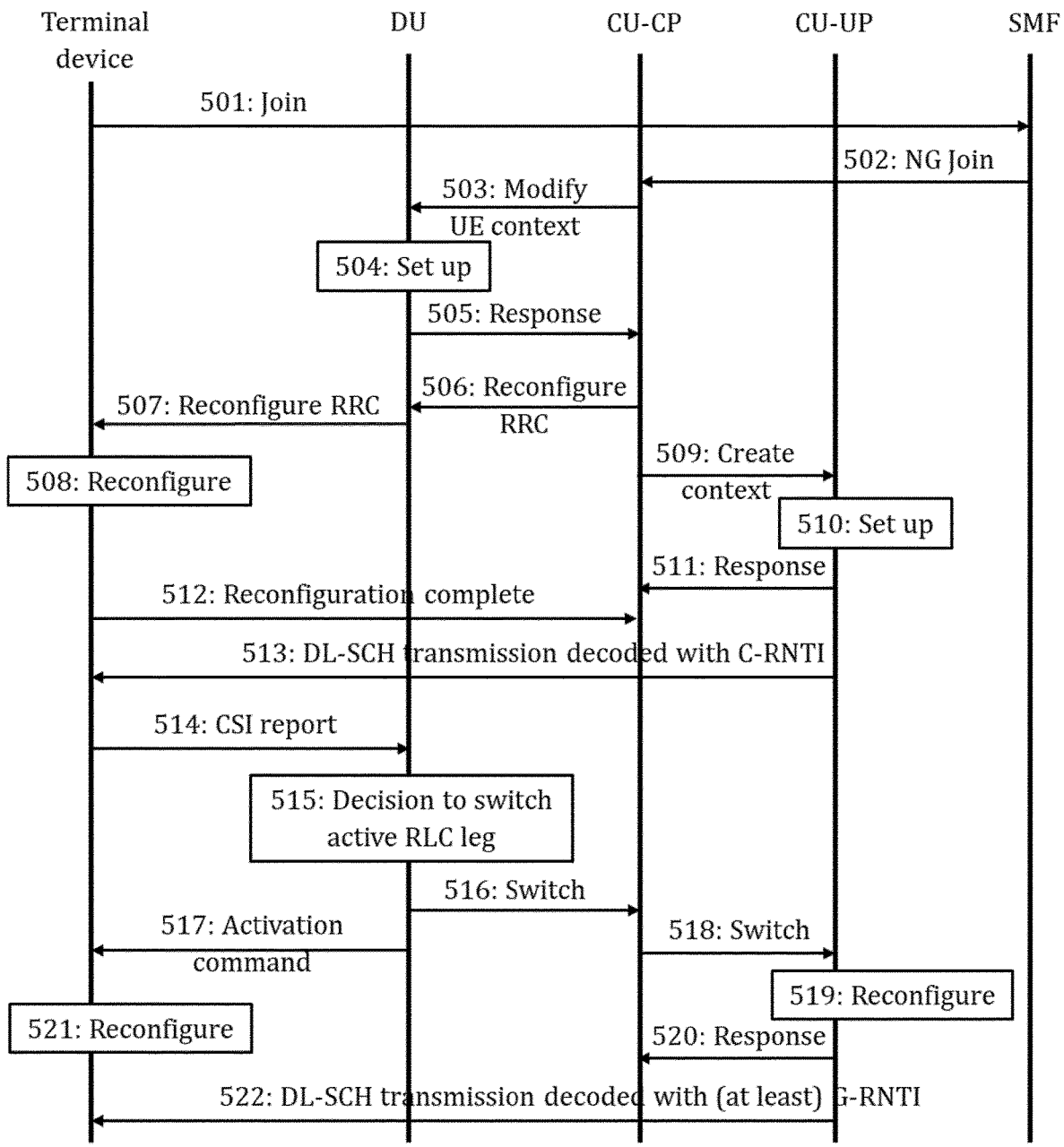
FIGS. 5 to 7 illustrate exemplary processes according to embodiments.

FIG. 5 illustrates processes according to embodiments for configuring a DRB for point-to-point transmission to a terminal device and a SC-MRB for point-to-multipoint transmission to the terminal device and dynamically triggering and performing switching between the unicast DRB and the (multicast) SC-MRB. Specifically, FIG. 5 illustrates signaling between a terminal device, a distributed unit (DU) of a distributed access node, control and user plane entities of central unit of the distributed access node (CU-CP & CU-UP) and a session management function (SMF) of a core network. The terminal device, the DU, the CU-CP, the CU-UP and the SMF of FIG. 5 may correspond to any of terminal devices 221-223, the DU 220, the CU-CP 231, the CU-UP 232 and the SMF 240 of FIG. 2, respectively. Additionally or alternatively, the terminal device, the DU, the CU (comprising the CU-CP and CU-UP) and the SMF of FIG. 5 may correspond equivalent elements of FIG. 1.

The embodiments illustrated in FIG. 5 correspond specifically to the first L2 protocol architecture as illustrated in FIG. 3. Thus, the illustrated embodiments correspond to a scenario where a data replication and forwarding function for the unicast DRB and the SC-MRB is implemented, at least in part, in the central unit of the distributed access node (as opposed to solely in the distributed unit).

While FIG. 5 does not explicitly show any (remote) radio units or radio heads for simplicity of presentation, it should be noted that transmission between the DU and the terminal device may be provided via a (remote) radio unit or radio head of the distributed access node. Moreover, while FIG. 5 shows signaling for one distributed unit of the distributed access node, the distributed access node in question may, in general, comprise one or more distributed units connected to the substantially same central unit. Furthermore, it should be noted that any transmission depicted between the central unit and the terminal device may be understood to occur via the distributed unit (or some another distributed unit) as well as via a (remote) radio unit or radio head. The definitions of this paragraph apply, in addition to FIG. 5, also to FIGS. 6 and 7 in a corresponding manner.

Referring to FIG. 5, the initial actions described with elements 501 to 512 relate to configuration of the terminal device and the distributed access node for implementing first and second two radio link control (RLC) legs for unicast and multicast transmission, respectively. First, the terminal device transmits, in message 501, a first join request to a session management function (SMF) of a core network for establishing or modifying a protocol data unit (PDU) session for the terminal device. The first join request may be sent via a user plane function (UPF) or an access and mobility management function (AMF) not shown in FIG. 5. The transmitting may be carried out via a distributed access node (e.g., the distributed access node of FIG. 5). In response to receiving the first join request, the SMF transmits, in message 502, a second join request to a control plane entity of the central unit of the distributed access node. The second joint request may be specifically a Next Generation (NG) join request, i.e., a join request transmitted over the NG interface. The second join request comprises information on a PDU session of the terminal device and an identifier for a multicast session (i.e., an Mcast ID). Said information on the PDU session of the terminal device may comprise the PDU session of the terminal device or a reference to the PDU session of the terminal device.

The control plane entity of the central unit transmits, in message 503, in response to receiving the second join request, to a distributed unit of the one or more distributed units, a request for creating and/or modifying a context of the terminal device by setting up a first RLC leg for a first radio bearer for point-to-point transmissions (i.e., unicast transmissions) to the terminal device and a second radio link control leg for a second radio bearer for point-to-multipoint transmissions (i.e., multicast transmissions) to the terminal device. The request may be specifically a F1 UE Context Modification Request. The first and second RLC legs (equally called unicast and multicast RLC legs) may be identified or characterized by a cell radio network temporary identifier (C-RNTI) and group radio network temporary identifier (G-RNTI). In this example, the first radio bearer is specifically a unicast data radio bearer (unicast DRB) and the second radio bearer is a single cell multicast radio bearer (SC-MRB). An alternative example where the first radio bearer and the second radio bearer correspond to the substantially same SC-MRB is discussed below in connection with FIG. 6.

It is assumed here that one of the first and second RLC legs is to be set initially as active (and the other one as inactive). Specifically, the first RLC leg may be set initially as active. In other words, the distributed access node may be configured initially to transmit (multicast) data as point-to-point transmissions to the terminal device and the terminal device may be configured to receive (multicast) data transmitted point-to-point transmissions. The opposite case where the second RLC leg is initially active (and the associated point-to-multipoint transmission is to be deactivated for a terminal device) is discussed following the discussion of FIG. 6.

The request for creating and/or modifying the context of the terminal device (i.e., message 503) may comprise the identifier for the multicast session (i.e., Mcast ID) and information on the first RLC leg (i.e., the unicast RLC leg), the second RLC leg (i.e., the multicast RLC leg) and first and second (downlink) tunnels associated with the first and second RLC legs to be set up. In some embodiments, one or more of said elements may be included in the request. In some embodiments, the request may comprise a RRC reconfiguration message to be transmitted by the distributed unit to the terminal device (i.e., a RRC-Container information element (IE)). In such embodiments, message 506 of FIG. 5 may be omitted.

The distributed unit sets up (or configures), in block 504, based on the received request, the first and second RLC legs and the first and second tunnels between the distributed unit and the central unit for the first and second RLC legs (i.e., for the unicast DRB and the SC-MRB), respectively. Said first and second tunnels may be specifically F1-U tunnels. This setup process may comprise generating identification information on the first and second tunnels. Said identification information on the first and second tunnels may specifically correspond to first and second tunnel end-point identifiers (TEIDs) for the first and second tunnels defined for the first and second RLC legs (i.e., for the unicast DRB and the SC-MRB). Consequently or subsequently, the distributed unit transmits, in message 505, a response to the request back to the control plane entity of the central unit. Said response may comprise at least said first and second TEIDs. Moreover, said response may comprise the identifier for the multicast session (i.e., the Mcast ID). The response may be specifically a F1 UE Context Modification Response.

The control plane entity receives the response to the request and causes configuring, in elements 509 to 511, the user plane entity of the central unit to use the first and second RLC legs and the first and second tunnels according to the received response. Specifically, the control plane entity transmits, in message 509, a context creation message to the user plane entity. The context creation message comprises information for setting up the first and second radio bearers (i.e., the unicast DRB and the SC-MRB) and the first and second tunnels (e.g., the first and second TEIDs) in the user plane entity. The context creation message may comprise the identifier of the multicast session (i.e., the Mcast ID). The context creation message may be specifically transmitted over an E1 interface. The user plane entity of the central unit sets up, in block 510, the first and second radio bearers (i.e., the first and second RLC legs) and the first and second tunnels for the user plane entity based on the context creation message and transmits, in message 511, a response to the context creation message back to the control plane entity of the central unit.

The reconfiguration of the terminal device (elements 506, 507, 508, 512) may take place in parallel with the aforementioned configuration of the user plane entity of the central unit. To this end, the control plane entity of the central unit transmits, in message 506, to the distributed unit, a RRC reconfiguration message for configuring, to the terminal device, the first radio bearer (i.e., the unicast DRB), the second radio bearer (i.e., the SC-MRB) and channel state information measurements associated with the first and second radio bearers. In some embodiments, the RRC reconfiguration message may be for configuring, to the terminal device, instead or in addition to channel state information measurements, hybrid automatic repeat request (HARQ) functionality. In some embodiments, the RRC reconfiguration message 506 may be comprised in message 503, as mentioned above. In response to receiving said RRC reconfiguration message, the distributed unit transmits (or relays), in message 507, said RRC reconfiguration message further to the terminal device. In response to receiving said RRC reconfiguration message, the terminal device performs, in block 508, configuration according to the radio resource control reconfiguration message. Once the reconfiguration has completed in the terminal device, the terminal device may also transmit, in message 512, a reconfiguration complete message to the control plane entity of the central unit.

In summary, after the configuration in elements 501 to 512, the distributed unit may maintain, in at least one memory of the distributed unit, information on a configuration of the first RLC leg for the first radio bearer for point-to-point transmissions to the terminal device identified by the cell radio network temporary identifier and a configuration of the second RLC leg for the second radio bearer for point-to-multipoint transmissions to the terminal device identified by the group radio network temporary identifier. Here, the first radio bearer is the unicast data radio bearer, the second radio bearer is the single cell multicast radio bearer and the first and second RLC legs have been configured so that the first RLC leg is currently active and the second RLC leg is inactive. Correspondingly, the terminal device may maintain, in at least one memory of the terminal device, information on a configuration of the first RLC leg for the first radio bearer for receiving point-to-point transmissions from the distributed access node, a configuration of the second RLC leg for the second radio bearer for receiving point-to-multipoint transmissions from the distributed access node and a configuration of channel state information measurements and/or HARQ associated with the first and second RLC legs. Here, the first radio bearer is the unicast data radio bearer, the second radio bearer is the single cell multicast radio bearer, the configuration of the first RLC leg comprises the cell radio network temporary identifier and the configuration of the second RLC leg comprises the group cell radio network temporary identifier. Specifically, the distributed access node and the terminal device may maintain such information regarding the configuration of the first and the second RLC legs which is relevant or necessary for the operation of the distributed access node and the terminal device using the first and second RLC legs, respectively.

Once the control plane entity of the central unit of the distributed access node has been informed that both the terminal device and the user plane entity of the central unit have been configured to employ the first and second RLC legs in messages 511, 512, the transmission using said first and second RLC legs (that is, using one of them which is set as active) may commence.

At this point, the user plane entity of the central unit forwards, in message 513, in response to receiving, in the user plane entity of the central unit, multicast data associated with the multicast session and the terminal device, received multicast data to the terminal device over the downlink shared channel (DL-SCH) the unicast DRB being currently active via the first tunnel and using the C-RNTI. In other words, the multicast data is scrambled using the C-RNTI and transmitted over the first RLC leg. Specifically, said multicast data may have been received at the user plane entity over an N3 tunnel associated with the multicast session.

In response to receiving said multicast data via the DL-SCH the first RLC leg from the user plane entity of the central unit, the terminal device decodes the received data using the C-RNTI corresponding to the first second RLC leg. In other words, the C-RNTI is used for decoding transmission over the first RLC leg.

The terminal device reports, in message 514, channel state information to the distributed unit according to the configuration of channel state information measurements (carried out in block 508). In some embodiments, the terminal device may transmit, in message 514, along with or alternative to the channel state information, hybrid automatic repeat request (HARQ) feedback.

The distributed unit receives the channel state information and/or HARQ feedback associated with the first RLC leg from the terminal device. Based on the channel state information and/or the HARQ feedback for at least said terminal device, the distributed unit determines, in block 515 whether improved efficiency for the terminal device according to pre-defined criteria is enabled if the second RLC legs (i.e., the currently inactive RLC leg) is set as active (and the first RLC leg is set as inactive). In other words, it is evaluated in block 515 whether a switch from point-to-point transmission to point-to-multipoint transmission should be carried out for the terminal device. Efficiency may be defined here, e.g., in terms of overall radio resources needed for transmission of data to some or all terminal devices in a multicast group of the terminal device. The determining in block 515 may consider, for example, the number of terminal devices receiving multicast transmissions identified by the substantially same identifier for the multicast session (e.g., by the substantially same Mcast ID). The pre-defined criteria may comprise one or more pre-defined (upper or lower) limits or thresholds for an efficiency metric (or specifically a resource efficiency metric) and/or for the number of terminal devices in the substantially same multicast group as the terminal device (determined based on the identifier for the multicast session).

While FIG. 5 shows operation for a single terminal device, the distributed unit may receive channel state information and/or HARQ feedback also from one or more terminal devices being in a multicast group with said terminal device. Thus, the distributed unit may perform the determining in block 515 also based on the channel state information and/or HARQ feedback received from the one or more terminal devices. The distributed unit is aware of the terminal devices in the multicast group with said terminal device (i.e., the terminal device depicted in FIG. 5) based on the identifier for the multicast session (i.e., the Mcast ID) provided in message 503.

In FIG. 5, it is assumed that the distributed unit determines, in block 515, that improved efficiency for the terminal device according to the pre-defined criteria is enabled if the second RLC leg (i.e., the currently inactive RLC leg) is set as active (and the first RLC leg is set as inactive). Consequently, the distributed unit transmits, in message 516, information on the switching decision to the control plane entity of the central unit for implementing the switching in the central unit (over the F1-C interface). In response to receiving the information on the switching decision from the distributed unit, the control plane entity of the central unit configures (in messages 518-520) the user plane entity according to the information on the switching decision. Specifically, the control plane entity of the central unit transmits, in message 518, the information on the switching decision further to the user plane entity of the central unit (over the E1 interface). The central unit reconfigures, in block 519, itself according to the information on the switching decision and transmits, in message 520, a response back to the control plane entity of the central unit.

In order to also reconfigure the terminal device according to the switching decision, the distributed unit transmits, in message 517, to the terminal device, an activation command for activating monitoring and decoding of a physical downlink control channel (PDCCH) using the group radio network temporary identifier associated with the currently inactive second RLC leg to subsequently receive, in the terminal device, (multicast) data using said currently inactive second RLC leg corresponding to the SC-MRB for point-to-multipoint transmission on the DL-SCH. The activation command may be transmitted specifically as a medium access control control element (MAC CE) containing "Activate SC-MRB". Despite of the aforementioned activation command, the terminal device may still continue decoding also using the C-RNTI to receive radio bearers (i.e., signaling radio bearers, SRBs, and other DRBs) other than said unicast data radio bearer associated with the first RLC leg. In response to receiving the activation command, the terminal device reconfigures, in block 520, itself accordingly.

In some alternative embodiments (not illustrated in FIG. 5), the activation command may be transmitted by the control plane entity unit of the central unit, instead of the distributed unit as described above. In such embodiments, the activation command may be transmitted specifically as an RRC message.

Finally, the user plane entity of the central unit again forwards, in message 522, in response to receiving, in the user plane entity, multicast data associated with the multicast session and with the terminal device, received multicast data to the terminal device over the DL-SCH. However, now the user plane entity uses a different one of the unicast DRB and the second SC-MRB, a different one of the C-RNTI and G-RNTI and a different tunnel of the first and second tunnels (i.e., a different one of the first and second RLC legs) for the forwarding compared to the forwarding in message 513. Correspondingly, the terminal device uses a different one of the C-RNTI and G-RNTI for decoding the multicast data of message 522 compared to the multicast data of message 513. In other words, the terminal device receives, in messages 522, multicast data on the second radio bearer over the second radio link control leg from the user plane entity of the central unit of the distributed access node by decoding the downlink shared channel using the group ra-dio network temporary identifier.

Above, it was assumed that the first and second RLC legs and the first and second tunnels had not been previously configured to the terminal device and to the distributed access node. However, it may occur that another terminal device may have previously set up a multicast RLC leg with the substantially same multicast session (i.e., the substantially same Mcast ID) and for the substantially same distributed access node. In such a case, the second RLC leg and the second tunnel associated with point-to-multipoint transmissions as defined above would, thus, already be configured to the distributed access node and thus do not have to be configured again. In more general embodiments, the setting up of the first and second RLC legs and the first and second tunnels by the distributed unit (in block 504) may comprise the following. In response to detecting that no multicast session matching the identifier for the multicast session (included in message 503) exists, the distributed unit sets up the first and second RLC legs, a first (downlink) tunnel for the first radio link control leg and a second (downlink) tunnel for the second RLC leg based on the request. However, in response to detecting that a multicast session matching the identifier for the multicast session exists with an associated shared tunnel, the distributed unit sets up the first and second radio link control legs and the first tunnel for the first radio link control leg and maps the second RLC leg to the existing shared tunnel based on the request. Correspondingly, if the second RLC leg and the second tunnel have already been configured to the distributed access node, the identification information for the second tunnel (e.g., the second TEID) may be omitted from messages 505, 509.

Figure 6:
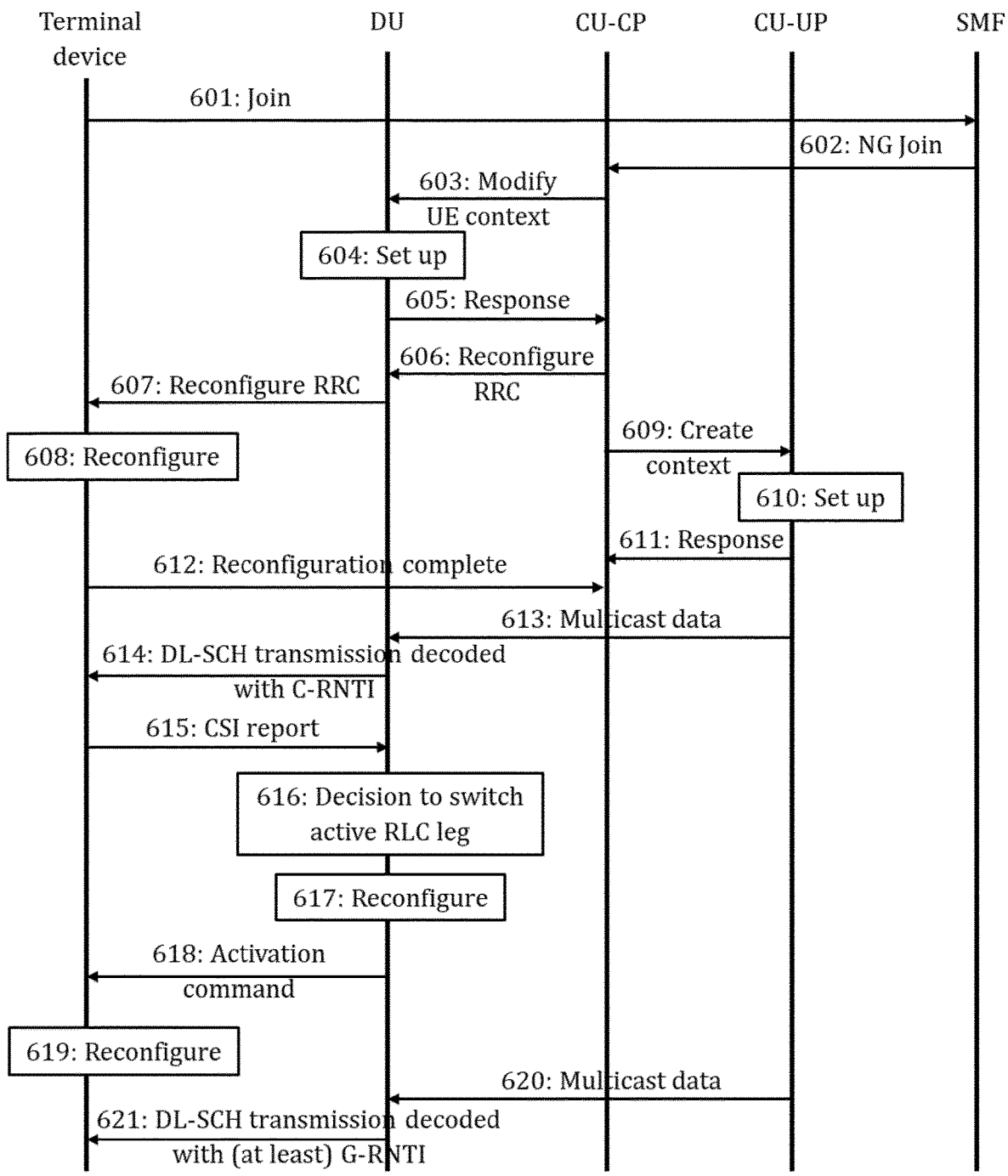

FIG. 6 illustrates processes according to embodiments for configuring a SC-MRB for both point-to-point and point-to-multipoint transmissions to a terminal device as two RLC legs and dynamically triggering and performing switching between the two RLC legs defined for the SC-MRB. Specifically, FIG. 6 illustrates, similar to FIG. 5, signaling between a terminal device, a distributed unit (DU) of a distributed access node, control and user plane entities of central unit of the distributed access node (CU-CP & CU-UP) and a session management function (SMF) of a core network. The terminal device, the DU, the CU-CP, the CU-UP and the SMF of FIG. 6 may correspond to any of terminal devices 221-223, the DU 220, the CU-CP 231, the CU-UP 232 and the SMF 240 of FIG. 2, respectively. Additionally or alternatively, the terminal device, the DU, the CU (comprising the CU-CP and CU-UP) and the SMF of FIG. 6 may correspond equivalent elements of FIG. 1.

The embodiments illustrated in FIG. 6 correspond specifically to the second L2 protocol architecture as illustrated in FIG. 4. Thus, the illustrated embodiments correspond to a scenario where a data replication and forwarding function for the SC-MRB (employed by both of the two RLC legs) is implemented in the distributed unit.

Many of the processes illustrated in FIG. 6 correspond, fully or at least in part, to the corresponding processes described in relation to FIG. 5. Therefore, unless otherwise stated, the messages and actions illustrated in FIG. 6 may be understood be defined as previously described in relation to the corresponding messages and actions in FIG. 5 (assuming that such a corresponding message/action exists in FIG. 5). The following discussion is, thus, concentrated on the differences of FIG. 6 compared to FIG. 5.

The initial actions 601-612 illustrated in FIG. 6 relating to the configuration of first and second RLC legs for the terminal device and the distributed access node may be carried out for the most part as described in relation to respective elements 501-512 of FIG. 5. As mentioned above, in this case the first and second RLC legs are defined as depicted in FIG. 4, that is, a first RLC leg for point-to-point transmissions (i.e., unicast) is associated with a SC-MRB and a C-RNTI and a second RLC leg for point-to-multipoint transmissions (i.e., multicast) is associated with the substantially same SC-MRB and a G-RNTI. Thus, one radio bearer is defined for the two RLC legs (as opposed to two in FIG. 5). Consequently, a single shared (downlink) tunnel (that is, a single F1-U shared tunnel) may be set up for the first and second RLC legs. The request for creating and/or modifying the context of the terminal device, that is, message 603, may, thus, comprise the identifier for the multicast session (i.e., Mcast ID) and information on the first RLC leg (i.e., the unicast RLC leg), the second RLC leg (i.e., the multicast RLC leg) and a shared tunnel associated with the first and second RLC legs to be set up. Also, in some embodiments, the request may comprise a RRC reconfiguration message to be transmitted by the distributed unit to the terminal device (i.e., a RRC-Container information element (IE)) in which case the message 606 of FIG. 6 may be omitted. Correspondingly, identification information on the shared tunnel (e.g., a single TEID) may be generated in block 604 and subsequently included in message 605. Moreover, the RRC reconfiguration message 606, 607 is, in this case, a RRC reconfiguration message for configuring, to the terminal device, the SC-MRB (i.e., not the unicast DRB) and channel state information measurements and/or HARQ feedback configuration associated with SC-MRB and the context creation message 609 comprises information for setting up the SC-MRB (but not the unicast DRB) and the shared tunnel (e.g., the TEID).

The big difference between the processes of FIG. 6 and the processes of FIG. 5 is that, in FIG. 6, the data replication and forwarding is carried out in the distributed unit. Therefore, the decision on which of the first and second RLC legs is to be used for transmission to the terminal device is performed fully in the distributed unit. Correspondingly, the user plane entity of the central unit transmits, in message 613, in response to receiving, in the user plane entity, multicast data associated with the multicast session and the terminal device, the received multicast data via the shared tunnel to the distributed unit for further transmission (using one of the first and second RLC legs) to the terminal device. It should be emphasized that, in contrast to FIG. 5, in this case the user plane entity does not make the decision on whether the multicast data is to be transmitted as a point-to-point transmission (using the C-RNTI) or as a point-to-multipoint transmission (using the G-RNTI). The user plane entity merely transmits the multicast data to the distributed unit which is configured to make said decision. Accordingly, the distributed unit forwards, in message 614, in response to the receiving of the multicast data associated with the multicast session and the terminal device from the user plane entity via the shared tunnel, received data to the terminal device over the downlink shared channel using one of the first and second RLC legs being currently active and a corresponding one of the C-RNTI and the G-RNTI (i.e., using one of the C-RNTI and the G-RNTI for encoding or scrambling the multicast data). Specifically, the first RLC leg may be at this point active.

The CSI and/or HARQ feedback reporting in message 615 and determining whether a switching of the active RLC leg should be carried out in block 616 may be performed as described in relation to elements 514, 515 of FIG. 5, respectively. Similar to FIG. 5, it is also assumed here that a switch of the active RLC leg is determined to be necessary in element 515. However, as in this case, the RLC leg to be used for transmission is selected in the distributed unit (and not in the central unit), there is no need to reconfigure the central unit following the decision to switch the active RLC leg. Instead, the distributed unit needs to reconfigure, in block 617, itself according to the switching decision. Obviously, the terminal device needs to be reconfigured also in this case. Said reconfiguring of the terminal device in elements 618, 619 may be performed in a similar manner as described in relation to FIG. 5. Namely, the distributed unit transmits, in message 618, an activation command, for example, a MAC control element (CE) containing "Activate SC-MRB". Upon the reception of the activation command, the terminal device starts to decode PDCCH and consequently DL-SCH using the G-RNTI (and the C-RNTI for receiving radio bearers other than said unicast data radio bearer associated with the first RLC leg). The elements 620, 621 may correspond to elements 613, 614 with the difference that now a different one of the C-RNTI and G-RNTI (i.e., a different one of the first and second RLC legs) is used for the transmission in message 621 (compared to message 614) due to the switching.

Similar to as described in connection with FIG. 5, it may occur also in this case that another terminal device has already previously set up a multicast RLC leg with the substantially same multicast session (i.e., the substantially same Mcast ID) and for the substantially same distributed access node. In such a case, the shared tunnel may already be configured to the distributed access node and thus does not have to be configured again. In more general embodiments, the setting up of the first and second RLC legs and the shared tunnel by the distributed unit (in block 604) may comprise the following. In response to detecting that no multicast session matching the identifier for the multicast session (included in message 603) exists, the distributed unit sets up the first and second RLC legs and a shared (downlink) tunnel for the first and second RLC legs based on the request. However, in response to detecting that a multicast session matching the identifier for the multicast session exists with an associated shared tunnel, the distributed unit sets up the first and second RLC legs and maps the first and second RLC legs to said shared tunnel based on the request. Correspondingly, if the shared tunnel has already been configured to the distributed access node, the identification information for the second tunnel (e.g., the TEID) may be omitted from messages 605, 609.

While only the activation of the point-to-multipoint transmission was discussed in detail in connection with FIGS. 5 and 6, the deactivation of the point-to-multipoint transmission (i.e., of the second RLC leg) may be carried out also in a corresponding manner following the activation (i.e., after the process of FIG. 5 or 6). Specifically, the distributed unit may receive further channel state information and/or hybrid automatic repeat request feedback associated with the second RLC leg being currently active from the terminal device. Then, the distributed unit may determine, based at least on said further channel state information and/or hybrid automatic repeat request feedback, that improved efficiency for the terminal device according to the pre-defined criteria is enabled if the first RLC leg is set as active and the second RLC leg is set as inactive. Finally, the distributed unit may transmit, to the terminal device, a deactivation command for deactivating the monitoring and the decoding of the physical downlink control channel using the group radio network temporary identifier associated with the second radio link control leg and consequently stopping the receiving, in the terminal device, of multicast data using said second radio link control leg on the downlink shared channel. In response to receiving the deactivation command, the terminal device may configure itself according to said deactivation command. Said steps may carried out in a similar manner as described in detail for the corresponding steps of FIGS. 5 and/or 6 (with the obvious difference that, here, the second RLC leg is initially active and the first RLC leg is inactive and deactivation, instead of activation, of the point-to-multipoint transmission is carried out).

Figure 7:
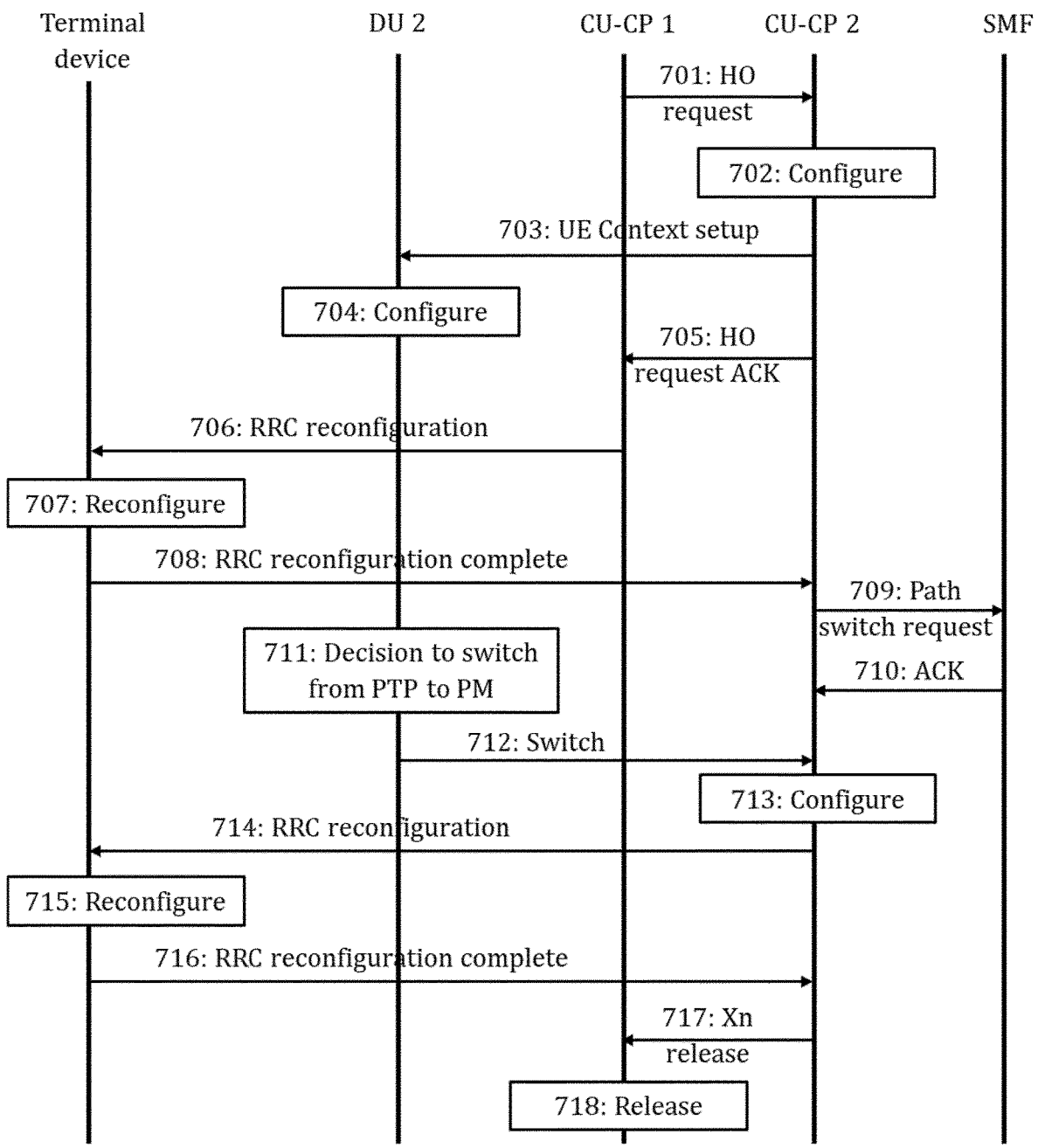

FIG. 7 illustrates processes according to embodiments for triggering and performing switching between unicast and multicast RLC legs (employing a unicast DRB and a SC-MRB, respectively) as a part of a handover (HO) procedure between neighboring distributed access nodes. Specifically, FIG. 7 illustrates signaling between a terminal device, a first distributed access node (here, a source distributed access node for the handover), a second distributed access node (here, a target distributed access node for the handover) and a session management function (SMF) of a core network. Specifically, the signaling related to the first and second distributed access nodes involves a second distributed unit (DU 2) of the second distributed access node, a first control plane entity of a first central unit (CU-CP 1) of the first distributed access node, a second control plane entity of a second central unit (CU-CP 2) of the second distributed access node. The terminal device, the DU 2, the CU-CP 1, the CU-CP 2 and the SMF of FIG. 7 may correspond to any of terminal devices 221-223, the DU 220, the CU-CP 231 and the SMF 240 of FIG. 2, respectively. Additionally or alternatively, the terminal device, the DU, the CU (comprising the CU-CP and CU-UP) and the SMF of FIG. 7 may correspond equivalent elements of FIG. 1.

The embodiments illustrated in FIG. 7 correspond specifically to the first L2 protocol architecture as illustrated in FIG. 3. Thus, the illustrated embodiments correspond to a scenario where a data replication and forwarding function for the unicast DRB and the SC-MRB is implemented, at least in part, in the central unit.

Referring to FIG. 7, it is initially assumed that the terminal device is connected to the first distributed access node. The terminal device and the first distributed access node may have been previously configured with at least a first RLC leg associated with a unicast DRB and optionally with a second RLC leg associated with a SC-MRB, e.g., as described in relation to elements 501 to 512 of FIG. 5. It is assumed that the first RLC leg (i.e., the unicast DRB) is initially active.

The handover (of the unicast DRB) is initiated by the first control plane entity of the first central unit transmitting, in message 701, a handover (HO) request regarding handover of the unicast DRB associated with the terminal device to the second control plane entity of the second central unit. The handover request may comprise at least an identifier for a multicast session of the terminal device (e.g., a Mcast ID). The handover request may be specifically an Xn Handover Request.

Upon receiving the HO request, the second control plane entity of the second central unit causes configuring the second distributed access node for the handover based on the handover request (in elements 702 to 704). Specifically, the second control plane entity of the second central unit may configure, in block 702, the second control plane entity for the handover, e.g., by allocating necessary resources such as PDU session resources. Said necessary resources may comprise at least resources for a unicast DRB used for transmission of multicast data. Moreover, the second control plane entity of the second control unit transmits, in message 703, a terminal device context setup request (i.e., a request for setting up of F1 UE context) resulting from a handover between the first and second distributed access nodes. Said terminal device context setup request comprises the received identifier for the multicast session (e.g., the Mcast ID). In response to receiving the terminal device context setup request, the second distributed unit configures, in block 704, the second distributed unit for handover according to the terminal device context setup request, e.g., by allocating necessary resources such as PDU session resources. Said necessary resources may comprise at least resources for a unicast DRB used for transmission of multicast data. The second distributed unit may acknowledge the successful allocation of necessary resources to the second control plane unit of the second central unit (not shown in FIG. 7).

Upon successful allocation of resources in the second control plane entity of the second central unit and the second distributed unit, a handover request acknowledgment (i.e., an Xn handover request acknowledgment) is transmitted, in message 705, from the second user plane entity of the second central unit to the first control plane entity of the first central unit.

Subsequently or consequently, the first control plane entity of the first central unit initiates the handover procedure by transmitting, in message 706, a RRC reconfiguration message to the terminal device (via a first distributed unit of the first distributed access node not shown in FIG. 7). The RRC reconfiguration message may comprise a specific handover command defining a handover (of the unicast DRB) to a second distributed access node. The terminal device reconfigures, in block 707, itself according to the RRC reconfiguration message and transmits, in message 708, a RRC reconfiguration completion message to the second control plane entity of the second central unit (via the second distributed unit). To fully complete the handover, the second control plane entity of the second central unit transmits, in message 709, a path switch request to the SMF. In response to successfully completing the requested path switch, the SMF transmits, in message 710, a path switch request acknowledgment (ACK) back to the second control plane entity of the second central unit to notify it of the completion of the handover.

After the completion of the handover, the second distributed unit determines, in block 711, whether a switch from point-to-point transmission to point-to-multipoint transmission should be carried out for the terminal device. The determining may be, for example, based on the number of terminal devices currently receiving the multicast data identified by the substantially same Mcast ID. Specifically, the determining may be based on the number of terminal devices receiving point-to-point transmissions identified by the identifier for the multicast session. In general, block 711 may correspond to either of block 515 of FIG. 5 or block 616 of FIG. 6. For example, if the number of terminal devices in the multicast session defined by the identifier for the multicast session is determined to be above a first pre-defined threshold, a switch from point-to-point to point-to-multipoint transmission may be triggered for a terminal device currently operating over the unicast DRB. Here, it is assumed that a switch is determined to be necessary in block 711.

In response to the switching decision in block 711, the second distributed unit transmits, in message 712, a request for reconfiguring the terminal device (or possibly terminal devices) according to the switching decision to the second control plane entity of the second central unit (over the F1-C interface). The message 712 may correspond to message 516 of FIG. 5. Though not explicitly shown in FIG. 7 for brevity, the processes described in relation to elements 518 to 520 of FIG. 5 may also be carried out in this case.

In response to receiving the request from the second distributed unit, the second control plane entity of the second central unit transmits, in message 713, a RRC reconfiguration message to the terminal device (via the distributed unit). In response to receiving the RRC reconfiguration message, the terminal device configures, in block 714, accordingly. The RRC reconfiguration may comprise specifically performing, by the terminal device, releasing of the unicast DRB and setting up of the SC-MRB (which is common for some or all terminal devices in the multicast group) or setting up of the SC-MRB in addition to the currently configured unicast DRB. Upon completion of the reconfiguration according to the RRC reconfiguration message, the terminal device may transmit, in message 716, a RRC reconfiguration complete message back to the second control plane entity of the second central unit of the second distributed access node. The second control plane entity of the second central unit of the second distributed access node subsequently receives the RRC reconfiguration complete message associated with said RRC reconfiguration message (message 713).

Finally, the second control plane entity of the second central unit transmits, in message 717, a release message (or specifically an Xn release message) to the first control plane entity of the first central unit, where the release message indicates that the first control plane entity of the first central unit may release any terminal device resources reserved for said terminal device. Correspondingly, the first control plane entity of the first central unit releases, in block 718, said resources. It should be noted that actions pertaining to elements 717, 718 may be carried out, in some embodiments, before the switching decision is made in block 711.

In some embodiments, a distributed unit may decide switch from point-to-multipoint transmission to point-to-point transmission (as opposed to from point-to-point transmission to point-to-multipoint transmission). The process may correspond to the process of FIG. 7, for the most part. Such a decision may be made, e.g., after a terminal device was handed over to another cell. In reference to FIG. 7, step 718 may, in such a case, further comprise transmitting, by the first control plane entity of the first central unit, a terminal device context release command to the first distributed unit (DU 1) to release the context of the terminal device in the source DU. The DU 1 stores, in the terminal device context, the identifier for the multicast session (i.e., the MCast ID), which is used by the distributed unit to keep the track of all terminal devices that join the multicast session. When the terminal device context is released, the DU 1 determines that the number of terminal devices has decreased. If the number of terminal devices is below a pre-defined threshold and/or CSI and/or HARQ of other terminal devices indicate that serving the terminal devices using point-to-point transmissions would be more efficient, then the DU 1 may determine to switch to point-to-point transmission by sending a deactivation command, e.g., as a MAC control element.

The blocks, related functions, and information exchanges (messages) described above by means of FIGS. 5 to 7 in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 8:
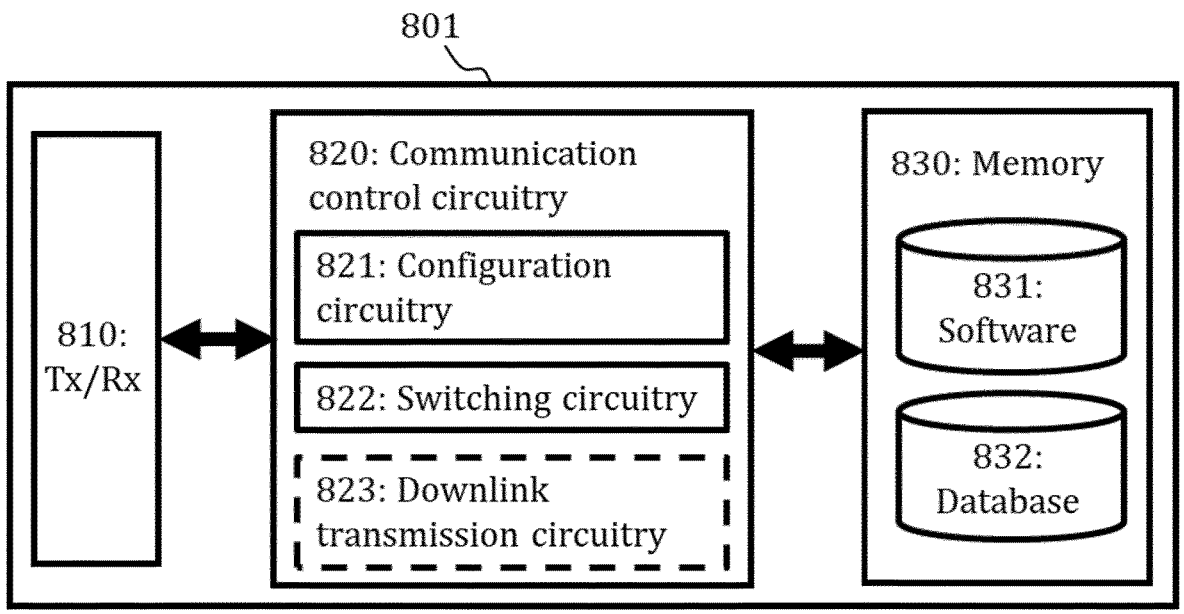
FIGS. 8 to 10 illustrate apparatuses according to embodiments.

FIG. 8 provides a distributed unit (DU) of a distributed access node (e.g., a gNB) according to some embodiments. Specifically, FIG. 8 may illustrate a distributed unit configured to carry out at least the functions described above in connection with configuration of RLC legs and/or switching between the configured RLC legs. The distributed unit 801 may be the distributed unit 104 of FIG. 1, the distributed unit 220 of FIG. 2 and/or the distributed unit of any of FIGS. 5 to 7. The distributed unit 801 may be configured to implement the L2 protocol architecture of FIG. 3 or 4.

The distributed unit 801 may comprise one or more control circuitry 820, such as at least one processor, and at least one memory 830, including one or more algorithms 831, such as a computer program code (software) wherein the at least one memory and the computer program code (software) are configured, with the at least one processor, to cause the distributed unit to carry out any one of the exemplified functionalities of the distributed unit described above. Said at least one memory 830 may also comprise at least one database 832.

Referring to FIG. 8, the one or more communication control circuitry 820 of the distributed unit 801 comprise at least configuration circuitry 821 which is configured to perform the configuration of the distributed unit 801 itself unit as well as causing configuration of terminal devices. To this end, the configuration circuitry 821 of the distributed unit 801 is configured to carry out at least some of the functionalities of the distributed unit described above, e.g., by means of any of elements 503 to 507 of FIG. 5, elements 603 to 607 of FIG. 6 and elements 703, 703 of FIG. 7, using one or more individual circuitries. The one or more communication control circuitry 820 of the distributed unit 801 further comprise switching circuitry 822 which is configured to perform the switching between the different RLC legs (i.e., switching between point-to-point and point-to-multipoint transmission) configured to the distributed access node. To this end, the switching circuitry 822 of the distributed unit 801 is configured to carry out at least some of the functionalities of the distributed unit described above, e.g., by means of any of elements 514 to 516 of FIG. 5, elements 615 to 618 of FIG. 6 and elements 711, 712 of FIG. 7, using one or more individual circuitries. In some embodiments (namely, the embodiments where the protocol architecture of FIG. 4 is employed), the one or more communication control circuitry 820 of the distributed unit 801 may further comprise downlink transmission circuitry 823 (illustrated with a dashed line to emphasize the optional nature) for transmitting data to the terminal device using an active one of the configured RLC legs, that is, implementing functionalities described in connection with any of elements 613, 614, 620, 621 of FIG. 6, using one or more individual circuitries.

Referring to FIG. 8, the memory 830 may be implemented using any suitable data storage technology, such as semiconductor based memory devices, flash memory, magnetic memory devices and systems, optical memory devices and systems, fixed memory and removable memory.

Referring to FIG. 8, the distributed unit 801 may further comprise different interfaces 810 such as one or more communication interfaces (TX/RX) comprising hardware and/or software for realizing communication connectivity according to one or more communication protocols. Specifically, the one or more communication interfaces 810 may comprise, for example, interfaces providing a connection to the Internet and a core network of a wireless communications network. The one or more communication interface 810 may provide the distributed unit with communication capabilities to communicate in a cellular communication system and enable communication between user devices (terminal devices) and different network nodes or elements and/or a communication interface to enable communication between different network nodes or elements, for example. The one or more communication interfaces 810 may comprise, for example, one or more F1-U interfaces and one or more F1-C interface. The one or more communication interfaces 810 may comprise standard well-known components such as an amplifier, filter, frequency-converter, (de)modulator, and encoder/decoder circuitries, controlled by the corresponding controlling units, and one or more antennas.

Figure 9:
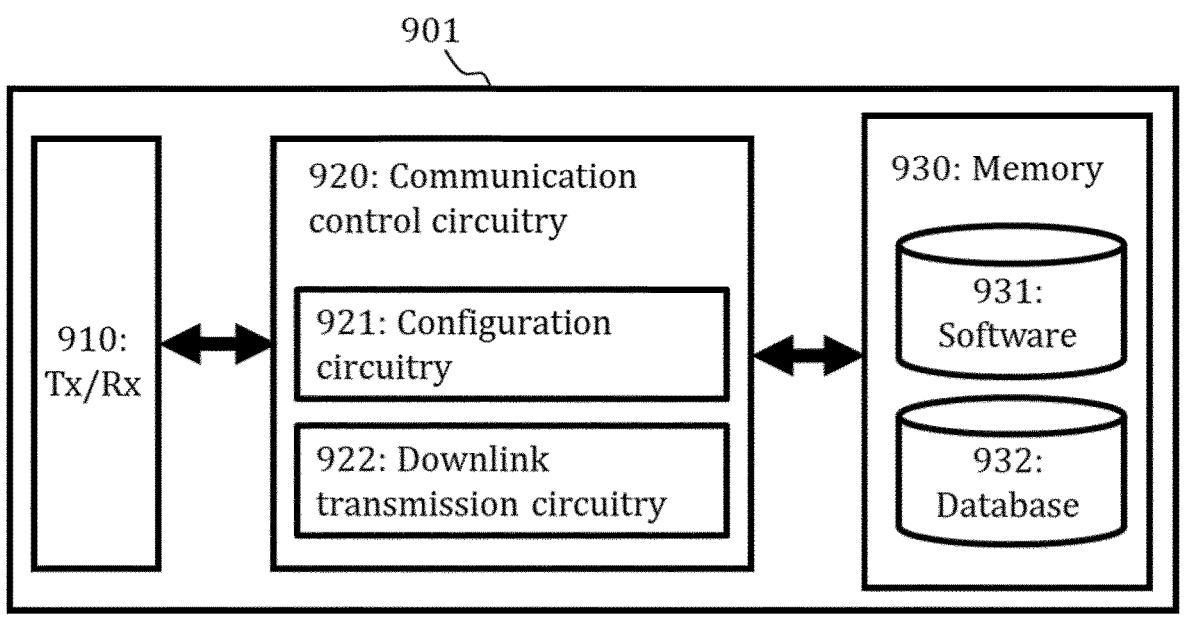

FIG. 9 provides a central unit (CU) of a distributed access node (e.g., a gNB) according to some embodiments. Specifically, FIG. 9 may illustrate a central unit configured to carry out at least the functions described above in connection with configuration of RLC legs and/or switching between the configured RLC legs. The central unit 901 may comprise a control plane entity and a user plane entity. The central unit 901 may be the central unit 108 of FIG. 1, the central unit 230 of FIG. 2 and/or the central unit of any of FIGS. 5 to 7. The central unit 901 may be configured to implement the L2 protocol architecture of FIG. 3 or 4.

The central unit 901 may comprise one or more control circuitry 920, such as at least one processor, and at least one memory 930, including one or more algorithms 931, such as a computer program code (software) wherein the at least one memory and the computer program code (software) are configured, with the at least one processor, to cause the central unit to carry out any one of the exemplified functionalities of the central unit described above. Said at least one memory 930 may also comprise at least one database 932.

Referring to FIG. 9, the one or more communication control circuitry 920 of the central unit 901 comprise at least configuration circuitry 921 which is configured to perform the configuration of the central unit itself 901 as well as optionally causing configuration of terminal devices. To this end, the configuration circuitry 921 of the distributed access node 901 is configured to carry out at least some of the functionalities of the central unit described above, e.g., by means of any of elements 502, 503, 505, 506, 509 to 512, 516 to 520 of FIG. 5, elements 602, 603, 605 to 612 of FIG. 6 and elements 701 to 703, 705, 706, 708 to 714, 716 to 718 of FIG. 7, using one or more individual circuitries. The one or more communication control circuitry 920 of the central unit 901 further comprise downlink transmission circuitry for transmitting data (or causing transmitting of data by the distributed unit) to the terminal device using an active one of the configured RLC legs, that is, implementing functionalities described in connection with any of elements 513, 522 of FIG. 5 and elements 613, 620 of FIG. 6, using one or more individual circuitries.

Referring to FIG. 9, the memory 930 may be implemented using any suitable data storage technology, such as semiconductor based memory devices, flash memory, magnetic memory devices and systems, optical memory devices and systems, fixed memory and removable memory.

Referring to FIG. 9, the central unit 901 may further comprise different interfaces 910 such as one or more communication interfaces (TX/RX) comprising hardware and/or software for realizing communication connectivity according to one or more communication protocols. Specifically, the one or more communication interfaces 910 may comprise, for example, interfaces providing a connection to the Internet and a core network of a wireless communications network. The one or more communication interface 910 may provide the central unit with communication capabilities to communicate in a cellular communication system and enable communication between user devices (terminal devices) and different network nodes or elements and/or a communication interface to enable communication between different network nodes or elements, for example. The one or more communication interfaces 910 may comprise, for example, one or more F1-U interfaces, one or more F1-C interface, one or more Xn interfaces and one or more NG interfaces. The one or more communication interfaces 910 may comprise standard well-known components such as an amplifier, filter, frequency-converter, (de)modulator, and encoder/decoder circuitries, controlled by the corresponding controlling units, and one or more antennas.

Figure 10:
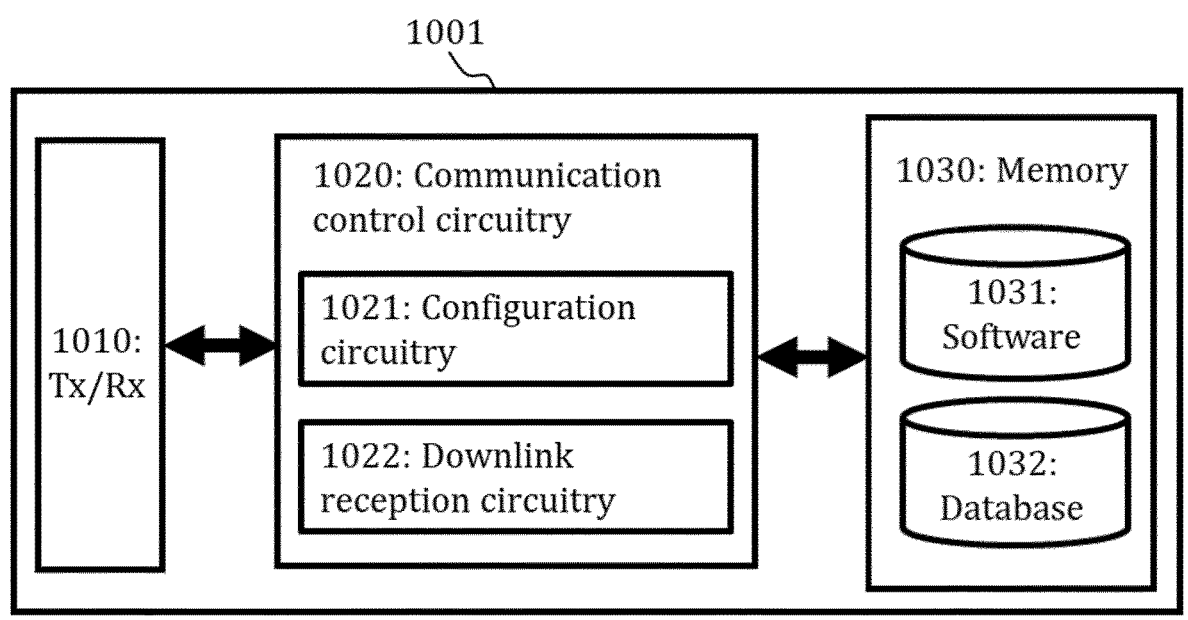

FIG. 10 provides a terminal device according to some embodiments. Specifically, FIG. 10 may illustrate a terminal device configured to carry out at least the functions described above in connection with configuration of RLC legs and/or switching between the configured RLC legs. The terminal device 1001 may be any of the terminal devices 100, 102 of FIG. 1, any of the terminal devices 221 to 223 of FIG. 2 and/or the terminal device of any of FIGS. 5 to 7. The terminal device 1001 may be configured to according to the L2 protocol architecture of FIG. 3 or 4.

The terminal device 1001 may comprise one or more control circuitry 1020, such as at least one processor, and at least one memory 1030, including one or more algorithms 1031, such as a computer program code (software) wherein the at least one memory and the computer program code (software) are configured, with the at least one processor, to cause the terminal device to carry out any one of the exemplified functionalities of the terminal device described above. Said at least one memory 1030 may also comprise at least one database 1032.

Referring to FIG. 10, the one or more communication control circuitry 1020 of the terminal device 1001 comprise at least configuration circuitry 1021 which is configured to perform the configuration of the terminal device 1001 (that is, both the pre-configuration of the RLC legs and subsequent reconfiguration in connection with switching). To this end, the configuration circuitry 1021 of the terminal device 1001 is configured to carry out at least some of the functionalities of the terminal device described above, e.g., by means of any of elements 507, 508, 512, 517, 521 of FIG.

5, elements 606, 607, 612, 618, 619 of FIG. 6 and elements 706 to 708, 714 to 716 of FIG. 7, using one or more individual circuitries. The one or more communication control circuitry 1020 of the terminal device 1001 further comprise downlink reception circuitry 1022 for reception of data using an active one of the configured RLC legs and performing associated reporting functionalities. To this end, the downlink reception circuitry 1022 of the terminal device 1001 is configured to carry out at least some of the functionalities of the terminal device described above, e.g., by means of any of elements 513, 514, 522 of FIG. 5 and elements 614, 615, 621 of FIG. 6, using one or more individual circuitries.

Referring to FIG. 10, the memory 1030 may be implemented using any suitable data storage technology, such as semiconductor based memory devices, flash memory, magnetic memory devices and systems, optical memory devices and systems, fixed memory and removable memory.

Referring to FIG. 10, the terminal device 1001 may further comprise different interfaces 1010 such as one or more communication interfaces (TX/RX) comprising hardware and/or software for realizing communication connectivity according to one or more communication protocols. Specifically, the one or more communication interfaces 1010 may comprise, for example, interfaces providing a connection to the Internet and a core network of a wireless communications network. The one or more communication interface 1010 may provide the terminal device with communication capabilities to communicate in a cellular communication system and enable communication between user devices (terminal devices) and different network nodes or elements and/or a communication interface to enable communication between different network nodes or elements, for example. The one or more communication interfaces 1010 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 5 to 7 may be carried out by an apparatus comprising means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 5 to 7 or operations thereof.

Embodiments as described may also be carried out in the form of a computer process defined by a computer program or portions thereof. Embodiments of the methods described in connection with FIGS. 5 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An access node, the comprising:
   at least one processor; and
   at least one memory including computer program code;
   the at least one memory and the computer program code configured, with the at least one processor, to cause the access node at least to perform:
   sending, to a terminal device, information on a configuration of a first radio link control leg for a first radio bearer for point-to-point transmissions identified by a cell radio network temporary identifier and information on a configuration of a second radio link control leg for a second radio bearer for point-to-multipoint transmissions identified by a group radio network temporary identifier, wherein the first radio bearer is one of a unicast data radio bearer and a single cell multicast radio bearer, the second radio bearer is the single cell multicast radio bearer and the first and second radio link control legs have been configured so that the first radio link control leg is currently active and the second radio link control leg is inactive;

receiving channel state information and/or hybrid automatic repeat request feedback associated with the first radio link control leg being currently active from the terminal device;

determining, based at least on the channel state information and/or the hybrid automatic repeat request feedback, that improved efficiency for the terminal device according to pre-defined criteria is enabled if the second radio link control leg is set as active and the first radio link control leg is set as inactive; and transmitting, to the terminal device, an activation command for activating monitoring and decoding of a physical downlink control channel using the group radio network temporary identifier associated with the second radio link control leg to subsequently receive, in the terminal device, multicast data using the second radio link control leg on a downlink shared channel.

2. The access node according to claim 1, wherein the at least one memory and the computer program code are configured, with the at least one processor, to cause the access node to transmit the activation command as a medium access control element or a radio resource control message.

3. A terminal device comprising:
at least one processor; and
at least one memory including computer program code;
the at least one memory and the computer program code configured, with the at least one processor, to cause the terminal device unit at least to perform:
receiving, from an access node, information on a configuration of a first radio link control leg for a first radio bearer for receiving point-to-point transmissions, information on a configuration of a second radio link control leg for a second radio bearer for receiving point-to-multipoint transmissions and information on a configuration of channel state information measurements and/or hybrid automatic repeat request associated with the first and second radio link control legs, wherein the first radio bearer is one of a unicast data radio bearer and a single cell multicast radio bearer, the second radio bearer is the single cell multicast radio bearer, the configuration of the first radio link control leg comprises a cell radio network temporary identifier and the configuration of the second radio link control leg comprises a group cell radio network temporary identifier;
receiving, from a user plane of the access node, multicast data on the first radio bearer over the first radio link control leg by decoding a downlink shared channel using the cell radio network temporary identifier;
reporting channel state information and/or hybrid automatic repeat request feedback to the access node according to the configuration of the channel state information measurements and/or hybrid automatic repeat request;
configuring, in response to receiving, from the access node, an activation command for activating monitoring and decoding of a physical downlink control channel using the group radio network temporary identifier to receive using the second radio link control leg being currently inactive on the downlink shared channel, the terminal device according to the activation command; and receiving multicast data on the second radio bearer over the second radio link control leg from the user plane of the access node by decoding the downlink shared channel using the group radio network temporary identifier.

4. The terminal device of claim 3, wherein the activation command is received from a medium access control control element or is received from a radio resource control message.

5. The terminal device of claim 3, wherein the at least one memory and the computer program code are configured, with the at least one processor, to cause the terminal device to further perform, before the decoding:
transmitting a join request to a session management function of a core network for establishing a protocol data unit session for the terminal device;
receiving, from the control plane of the access node, a radio resource control reconfiguration message for configuring the first radio link control leg for receiving point-to-point transmissions, the second radio link control leg for receiving point-to-multipoint transmissions and channel state information measurements and/or hybrid automatic repeat request associated with the first and second radio link control legs;
configuring the terminal device according to the radio resource control reconfiguration message; and
transmitting a reconfiguration complete message to a control plane of the access node.

6. A method comprising:
receiving, from an access node, information on a configuration of a first radio link control leg for a first radio bearer for receiving point-to-point transmissions, information on a configuration of a second radio link control leg for a second radio bearer for receiving point-to-multipoint transmissions and information on a configuration of channel state information measurements and/or hybrid automatic repeat request associated with the first and second radio link control legs, wherein the first radio bearer is one of a unicast data radio bearer and a single cell multicast radio bearer, the second radio bearer is the single cell multicast radio bearer, the configuration of the first radio link control leg comprises a cell radio network temporary identifier and the configuration of the second radio link control leg comprises a group cell radio network temporary identifier;
receiving, from a user plane of the access node, multicast data on the first radio bearer over the first radio link control leg by decoding a downlink shared channel using the cell radio network temporary identifier;
reporting channel state information and/or hybrid automatic repeat request feedback to the access node according to the configuration of the channel state information measurements and/or hybrid automatic repeat request;
configuring, in response to receiving, from the access node, an activation command for activating monitoring and decoding of a physical downlink control channel using the group radio network temporary identifier to receive using the second radio link control leg being currently inactive on the downlink shared channel, the terminal device according to the activation command; and
receiving multicast data on the second radio bearer over the second radio link control leg from the user plane of the access node by decoding the downlink shared channel using the group radio network temporary identifier.

7. The method of claim 6, wherein the activation command is received from a medium access control control element or is received from a radio resource control message.

8. The method of claim 6, further comprising:
transmitting a join request to a session management function of a core network for establishing a protocol data unit session for the terminal device;
receiving, from the control plane of the access node, a radio resource control reconfiguration message for configuring the first radio link control leg for receiving point-to-point transmissions, the second radio link control leg for receiving point-to-multipoint transmissions and channel state information measurements and/or hybrid automatic repeat request associated with the first and second radio link control legs;
configuring the terminal device according to the radio resource control reconfiguration message; and
transmitting a reconfiguration complete message to a control plane of the access node.

* * * * *